INVENTORS
JACQUES TOULEMONDE
JEAN CHAUPIT

INVENTORS
JACQUES TOULEMONDE
JEAN CHAUPIT

BY
ATTORNEYS

United States Patent Office 3,521,145
Patented July 21, 1970

3,521,145
SEQUENCE FIRING OF SERIES-CONNECTED CONTROLLED RECTIFIERS
Jacques Toulemonde, Versailles, and Jean Chaupit, Fontenay-aux-Roses, France, assignors to Compagnie Generale d'Electricite, Paris, France, a corporation of France
Filed Dec. 3, 1968, Ser. No. 780,728
Claims priority, application France, Dec. 4, 1967, 130,889
Int. Cl. H03k 17/06; H02m 7/00
U.S. Cl. 321—27                4 Claims

ABSTRACT OF THE DISCLOSURE

A device for triggering a number of series-connected controlled rectifiers, each rectifier having its trigger circuit connected, through a full wave rectifying system, to the secondary winding of a transformer whose primary winding is connected to the anode of the preceding controlled rectifier which has already been fired.

BACKGROUND OF THE INVENTION

Field of the invention

The present invention relates to an electric installation by means of which a chain of series-connected controlled rectifiers, such as thyristors, can be triggered by acting on only one of them, called the pilot element, and extracting from the power circuit itself the energy necessary for triggering the other controlled rectifiers.

Description of the prior art

It is known to trigger a chain of series-connected thyristors by firing only one of them, called the pilot element, using an external signal. A trigger signal is supplied to the other thyristors by means of capacitive coupling between the gates, or control electrodes, of the said thyristors. FIG. 1 shows one circuit arrangement which is employed. In such an arrangement, the triggering in cascade of the chain of thyristors $T_1$, $T_2$ ... $T_n$ is effected by capacitive coupling between the gates (through resistance capacitance circuits, such as $R_1C_1$ in the case of the circuit of the thyristor 2, $R_2C_2$ in the case of the thyristor 3 and so on), when the pilot thyristor $T_1$ is fired by an external signal which may be supplied, for example, by a pulse generator.

If this triggering in cascade of a series of thyristors is analyzed as a function of time (see FIG. 2), it will be seen that the gate current $i_1$ which serves to fire the thyristor $T_2$ first increases, and then decreases and tends towards zero. When the thyristor $T_2$ fires, a further current $i_2$ of the same form as $i_1$, but shifted in relation thereto by an interval of time $\delta$, determined by the parameters of the circuit arrangement and of the thyristors (between a fraction of a microsecond and several microseconds), flows through the circuit of the thyristor $T_2$. The current which flows through the gate of the thyristor $T_2$, is the difference between the two currents:

$$i = i_1 - i_2$$

In other words, the gating signal of the thyristor is a current having a rise time of the order of a fraction of a microsecond which is cancelled out at the end of several microseconds (2 to 3 depending upon the circuit arrangement) and becomes negative after this period of time.

This form of gating pulse has a number of disadvantages: its duration is short as compared with the total firing time of the thyristor, and the presence of a negative gate current acts in opposition to the internal phenomena of the thyristors during this firing time. Consequently, the thyristor is controlled under conditions which are likely to cause partial firing and abnormal heating, particularly if the load circuit requires a relatively rapid rise of the principal current (high $dI/dt$).

It is also known to trigger a chain of series-connected thyristors by directly firing only one of them, called the pilot element, utilizing a circuit which comprises, in combination, a chain of RC voltage dividers in parallel with the main circuit, and transformers having their primary winding in the main circuit. The secondary winding of each aforesaid transformer is situated in the cathode-gate circuit of a thyristor to be triggered; the control pulse is taken from the voltage divider and transmitted by means of said transformer through a rectifying diode to the gate of the thyristor to be triggered.

In this type of installation, the transformers whose primary winding forms part of the main circuit carry a high current, which may in some applications reach 500, 1000 or more amperes, and are costly and difficult to construct. If the transformer has a core of large dimensions, the pulse intended for the control of the next thyristor will have a long rise time, which inhibits the successive firing of a whole chain. If the core is of small dimensions, the control pulse will be of the correct duration, but the high current which is applied to the primary winding will saturate the core at each firing, which necessitates a subsequent desaturation. In addition, energy losses due to magnetic hysteresis and heating must be taken into consideration.

SUMMARY OF THE INVENTION

Accordingly, in order to obviate the disadvantages in the operation and construction of the aforesaid known arrangements, the present invention comprises an electrical installation for triggering a number of series-connected controlled rectifiers, by means of pulses emitted by a pulse generator acting on the gate of only one of the controlled rectifiers, called the pilot element. In accordance with the invention, each of the controlled rectifiers is connected by its main terminals to the terminals of an elementary resistance-capacitance RC sequence forming part of a resistance-capacitance RC voltage dividing network; each of said rectifiers is also connected, by means of its gate, to the secondary winding of a transformer whose primary winding is traversed, when the preceding controlled rectifier is fired, by the discharge current of the capacitor of the elementary sequence corresponding to the said preceding rectifier, the said installation being distinguished in that the primary winding of the transformer is connected between the anode of the said preceding rectifier which has already been fired and the corresponding terminal of the RC circuit, and the secondary winding of the transformer feeds, through a full-wave rectifying system, the gate cathode circuit of the rectifier to be triggered, in the direction permitting the triggering of the said rectifier.

BRIEF DESCRIPTION OF THE DRAWINGS

Several preferred embodiments of the invention will now be described by way of example with reference to the accompanying drawings, in which.

DESCRIPTION OF THE PREFERRED EMBODIMENTS

Figure 3:
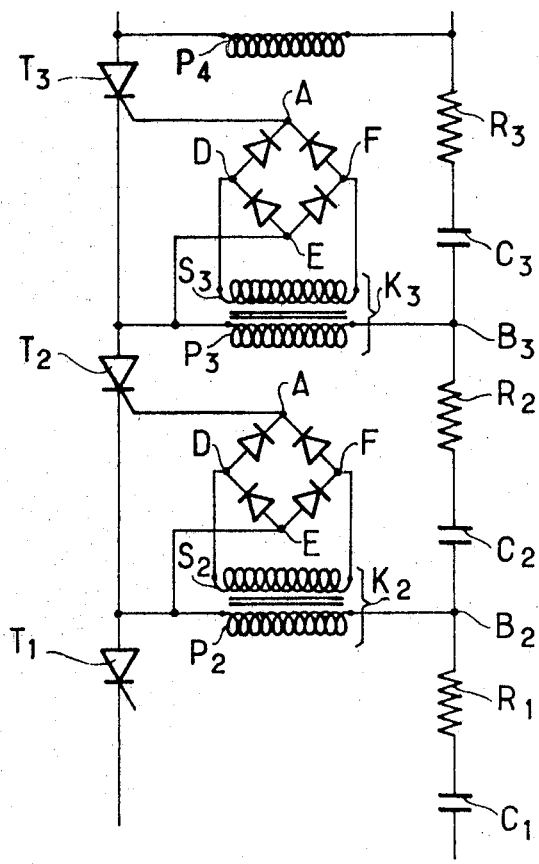
FIGS. 3, 5, 7, and 8 are schematic diagrams of electric circuits containing two or more consecutive controlled rectifiers in series.

In FIG. 3, the thyristor to be controlled is denoted by $T_2$. The primary winding $P_2$ of the transformer $K_2$ is connected to the terminal $B_2$ of the series of resistance-capacitance circuits $C_1$, $R_1$, $C_2$, $R_2$, $C_3$, $R_3$; said winding is also connected to the terminal E of the diode rectifying bridge AFED and to the cathode of the thyristor $T_2$. The secondary winding $S_2$ is connected to the terminals D and F of the rectifying bridge AFED while the terminal A of this said bridge is connected to the gate of $T_2$. When the thyristor $T_1$ has been triggered, a current $i_1$ flows through the primary winding of the transformer $K_2$. The signal derived by the secondary winding $S_2$ is rectified in the bridge AFED and injected into the gate-cathode circuit of the thyristor $T_2$.

Figure 1:
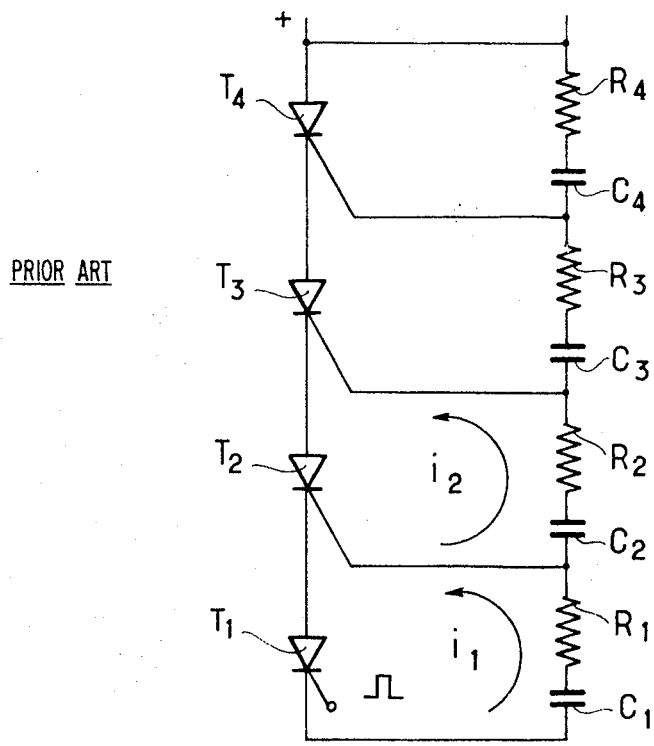
FIGS. 1 and 2 illustrate the state of the prior art as previously described.
Figure 2:
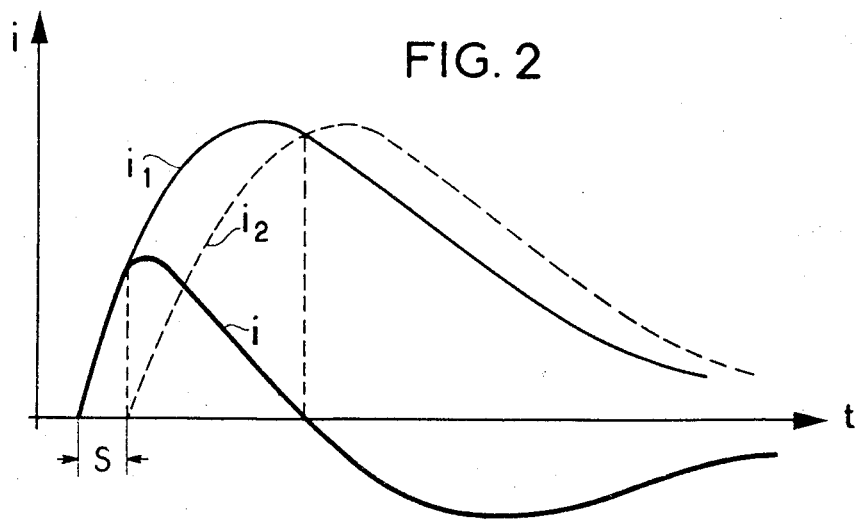
Figure 4:
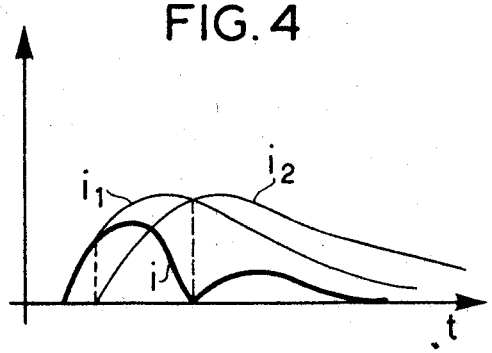
FIGS. 4 and 6 illustrate the variation of current in the gate circuits of FIGS. 3 and 5, respectively.

By means of such an arrangement, it is possible so to combine the two currents $i_1$ and $i_2$ as to avoid the inversion of the current $i$ as it appears in FIG. 2. The current $i$ increases and is cancelled out, but remains positive, as is shown in FIG. 4.

This form of control current avoids most of the disadvantages of the prior art, but the fact that the control current is cancelled out, even for a short time, is not favorable to a perfect firing of the thyristor.

In accordance with a further embodiment of the invention, this cancellation is avoided by mixing with the signal thus obtained a second signal taken from the normal firing current and appropriately delayed.

In the first embodiment, the transformers K comprise not only a secondary winding S but also a tertiary winding G. The control signal of a particular thyristor is obtained by mixing the rectified signal supplied by the secondary winding of the transformer associated with the said thyristor and the rectified signal supplied by the tertiary winding of the transformer associated with the next thyristor in the series.

Figure 5:
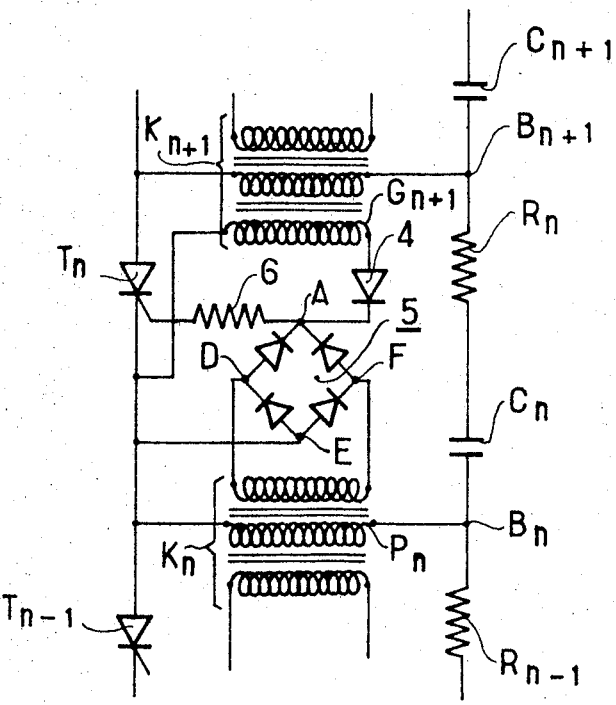

FIG. 5 illustrates an example of the application of this arrangement to the thyristor $T_n$ of a series.

The thyristor $T_n$ is connected by its anode to the primary winding of the transformer $K_{n+1}$, which is connected to the terminal $B_{n+1}$ of the RC chain. The cathode of the same thyristor $T_n$ is connected to the tertiary winding $G_{n+1}$ of the transformer $K_{n+1}$, which is in turn in series with the anodes of a diode 4, the terminal A of the bridge 5, the resistor 6 and finally the gate of $T_n$; the said cathode is further connected to the terminal E of the bridge 5 and also to the primary winding $P_n$ of the transformer $K_n$. The terminals F and D of the bridge 5 are directly connected to the secondary winding of the transformer $K_n$.

Figure 6:
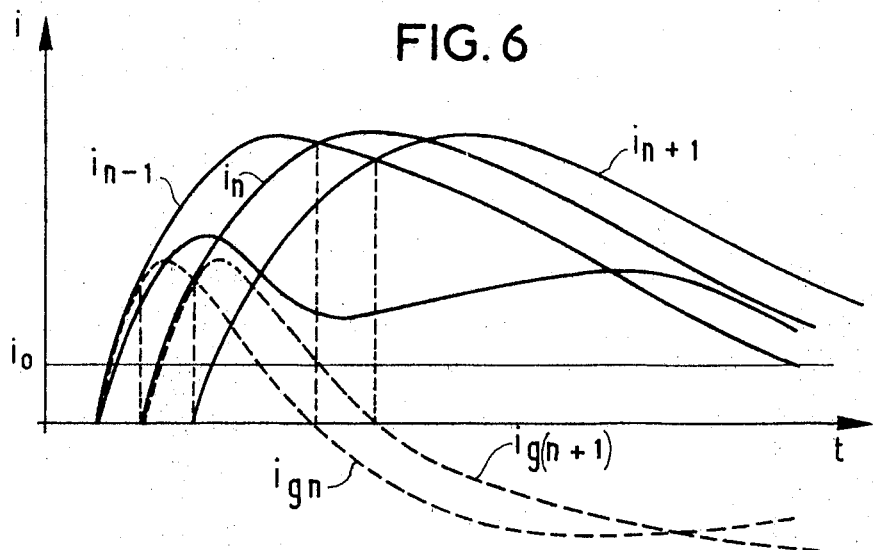

FIG. 6 illustrates the forms of currents observed. The currents flowing through the RC circuits are denoted by $i_{n-1}$, $i_n$ and $i_{n+1}$; the control currents obtained without the use of the tertiary windings are indicated by the curves $i_{gn}$ and $i_{g(n+1)}$. The control current resulting from the use of the invention is indicated at $i$.

In this arrangement, it is possible to vary the transformation ratios employed to shape the control pulse and more particularly to insure that the gate current has a minimum amplitude higher than the minimum firing current $i_0$ and a sufficient duration.

Figure 7:
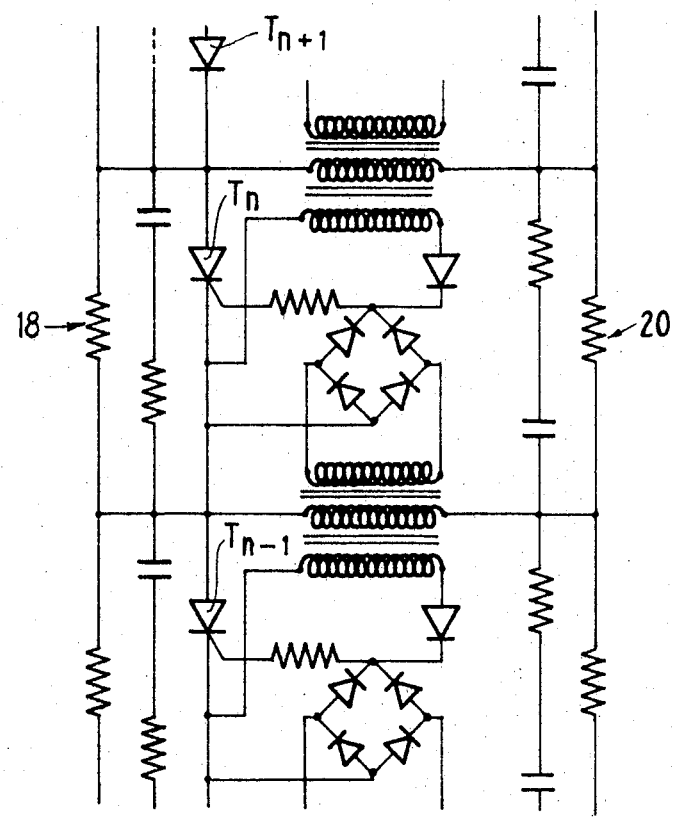

In the case of an arrangement comprising symmetrical RC networks 18, 20 as illustrated in FIG. 7, the use of a transformer permits obtaining a threshold which compensates for the imbalances due to the dispersion of the values of the components of the RC network, which are never perfectly symmetrical.

Another advantage peculiar to the circuit disclosed in FIG. 7 resides in the fact untimely triggering of one of the thyristors of the series results in triggering of the thyristors of the chain not only on the output side, but also on the input side of the thyristor which has been triggered at the wrong time. The arrangement disclosed herein thereby brings about an increase in the safety of the installation. The danger of breakdown of the thyristors which are situated on the input side of a thyristor triggered at the wrong time (and which remain unfired in the electrical triggering arrangement known to the prior art) is considerable, due to the sudden overload to which the aforesaid thyristors are accidentally subjected.

Figure 8:
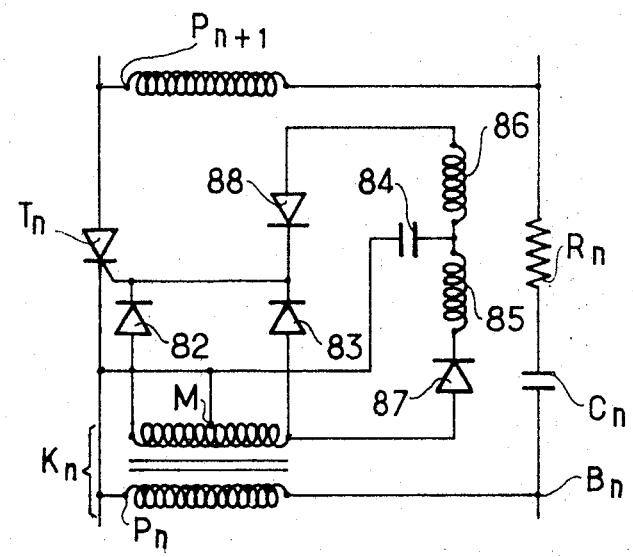

In another embodiment, as illustrated in FIG. 8, the transformer $K_n$ comprises two windings; it is inserted in the trigger circuit of the thyristor $T_n$ in such manner that the primary winding $P_n$ is connected to the cathode of the thyristor to be fired (which serves as reference potential for the whole triggering arrangement) and to the terminal $B_n$ of the RC network, while each end of the secondary winding is connected to an anode of diodes 82, 83. The cathodes of these diodes are connected to the trigger of the thyristor $T_n$ to be controlled, so as to obtain, in accordance with a known method, a full-wave rectification, the midpoint M of the secondary winding being connected to the cathode of this thyristor. In addition, there are connected in series between the end of the secondary winding connected to the diode 83 and the mid-point M of the secondary winding of the transformer $K_n$ the rectifying diode 87, a delay line represented by the capacitances and inductances 84, 85 and 86, the diode 88 and the gate of the thyristor to be controlled.

In this device, the full-wave rectifying arrangement supplies the main control signal, whose current-time characteristic corresponds to that of FIG. 4. The delay line associated with the rectifying and mixing diodes 87 and 88 respectively, permits using the positive part of the normal signal $i_{gn}$, which is appropriately delayed, to avoid cancellation of the control current. The composite signal which results corresponds to that denoted by $i$ in FIG. 6. It is possible to modify the pulse shape obtained by varying the relative impedances of the two circuits in accordance with the practice common in the art, or by connecting the anode of the diode 87 to an intermediate tap of the secondary winding of the transformer $K_n$.

While the invention has been particularly shown and described with reference to preferred embodiments thereof, it will be understood by those skilled in the art that various changes in form and detail may be made therein without departing from the spirit and scope of the invention.

What is claimed is:

1. In an electrical system for sequentially triggering a number of series-connected controlled rectifiers by means of pulses emitted by a pulse generator acting on the control gate of only one of the controlled rectifiers, called the pilot element, the combination comprising a plurality of controlled rectifiers, an RC resistance capacitance voltage dividing network, and a plurality of transformer and full-wave rectifier means, each of said controlled rectifiers having its main terminals connected to an elementary resistance-capacitance sequence forming part of said voltage dividing network, each of said controlled rectifiers further having its gate-cathode circuit connected to first and second opposite terminals of said full-wave rectifier means, said rectifier means having third and fourth opposite terminals connected to the secondary winding of said transformer, said transformer having its primary winding connected between the anode of the preceding, already fired, controlled rectifier and the corresponding terminal of said resistance-capacitance network, whereby the discharge current of the capacitor corresponding to an already fired controlled rectifier traverses the primary winding of said transformer and is transformed and rectified such that the output current of said full-wave rectifier means is in a direction appropriate for triggering said rectifier.

2. An electrical system as claimed in claim 1, wherein means are provided for adding to the output current of the aforesaid rectifying system an auxiliary current whose direction is the same as that of the said output signal and whose variation is delayed in relation to the latter by a time appropriate for bringing a high value of the said auxiliary current into coincidence with the minimum value of the said output current.

3. An electrical system as claimed in claim 1, wherein at least one of the aforesaid transformers, corresponding to one of the aforesaid controlled rectifiers, is provided with a tertiary winding which supplies through a rectifying element the aforesaid auxiliary current between the gate and the cathode and in the direction appropriate for the triggering of that one of the aforesaid controlled rectifiers which precedes the one to which the said transformer corresponds.

4. An electrical system as claimed in claim 1, wherein the secondary winding of at least one of the aforesaid transformers feeds a delay line which supplies, through a rectifying element, the aforesaid auxiliary current between the gate and the cathode and in the direction appropriate for the triggering of that one of the aforesaid controlled rectifiers to which the said transformer corresponds.

References Cited

UNITED STATES PATENTS

| | | | |
|---|---|---|---|
| 3,158,799 | 11/1964 | Kelly | 321—27 |
| 3,226,625 | 12/1965 | Diebold | 321—27 |
| 3,412,312 | 11/1968 | Rice | 321—11 |

FOREIGN PATENTS

| | | |
|---|---|---|
| 1,298,103 | 5/1962 | France. |
| 1,348,735 | 12/1963 | France. |

J D MILLER, Primary Examiner

W. H. BEHA, JR., Assistant Examiner

U.S. Cl. X.R.

307—252